Figure 1:
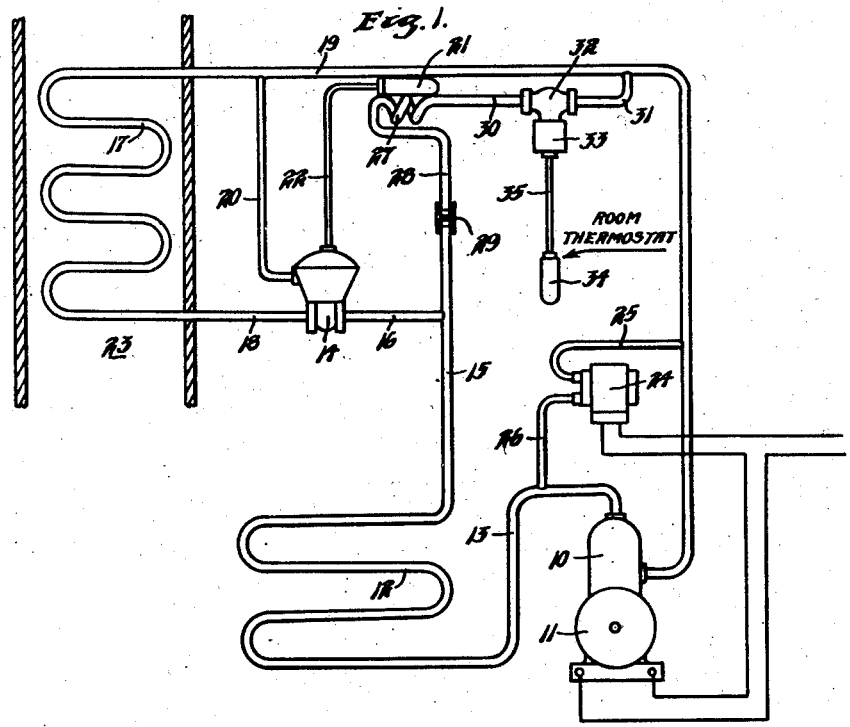

Nov. 16, 1948.　　　　A. B. NEWTON　　　　2,454,263
REFRIGERATION SYSTEM
Filed April 5, 1943　　　　　　　　　　3 Sheets-Sheet 3

Inventor
ALWIN B. NEWTON
By
George N. Fisher
Attorney

Patented Nov. 16, 1948

2,454,263

UNITED STATES PATENT OFFICE 2,454,263

REFRIGERATION SYSTEM

Alwin B. Newton, Minneapolis, Minn., assignor to Minneapolis-Honeywell Regulator Company, Minneapolis, Minn., a corporation of Delaware Application April 5, 1943, Serial No. 481,795

17 Claims. (Cl. 62—8)

1

In many applications of refrigerating apparatus it is highly desirable to vary the capacity of the system. Numerous manners of accomplishing this have been proposed in the past but, generally speaking, they are often too cumbersome and costly to meet the requirements in many commercial types of installations.

One of the objects of the present invention is the provision of a simple inexpensive arrangement by which the capacity of a refrigeration system may be modulatingly varied.

More specifically, it is an object of my invention to modulate the capacity of a refrigeration system by applying a variable amount of artificial cooling to the usual thermostatic element of a thermostatic expansion valve so as to vary the superheat of the refrigerant in the evaporator. To this end, I apply a variable cooling effect to the thermostatic element of the thermostatic expansion valve by utilizing refrigerant from the system whose capacity is being controlled.

I prefer to accomplish this result by, in effect, providing an auxiliary evaporator for cooling the thermostatic element of the thermostatic expansion valve and supplying to such auxiliary evaporator a varying amount of refrigerant under the control of a valve means, which refrigerant is obtained from the liquid line of the system and, after it has passed through the auxiliary evaporator, returns to the suction side of the system.

It is therefore a further object of my invention to vary the capacity of a refrigeration system by cooling the bulb or thermostatic element of the thermostatic expansion valve to a variable degree by the use of a small auxiliary evaporator which obtains its refrigerant from the system under control. By providing such an auxiliary evaporator, it is possible to modulate the amount of auxiliary cooling supplied to the thermostatic element of the thermostatic expansion valve whereas, if refrigerant were merely fed into the main portion of the system at an intermediate position in the evaporator or just ahead of the thermostatic element of the expansion valve, it would be impossible to obtain a modulating action.

Another problem in connection with the operation of refrigeration systems is to prevent overloading of such systems when they are first placed into operation and the load thereon is large. Various means of solving this problem have been theretofore proposed including such expedients as unloader valves, suction line valves, and the like. I propose, however, to accomplish this result by varying the superheat setting of

2 the thermostatic expansion valve so that a high degree of superheat will be maintained until such time as the suction pressure in the system has been reduced by operation of the system.

Another object of my invention therefore is the prevention of overloading of a refrigeration system, as may occur upon initial starting up of the system, by adjusting the superheat setting of the thermostatic expansion valve to a relatively high value when the system is first placed in operation and then automatically reducing the superheat setting thereof.

A further object of my invention is to control the superheat setting of the expansion valve, in a system as just described, in response to variations in suction pressure in such manner that the superheat setting of the expansion valve is relatively high when the suction pressure is high and is reduced to the normal desired setting upon reduction in suction pressure.

More specifically, I prefer to obtain this action by changing the temperature of the thermostatic element of the thermostatic expansion valve so that it is maintained at a temperature different than that at which it would be maintained solely by the flow of refrigerant through the evaporator. This is preferably accomplished by applying additional cooling for the thermostatic element of the expansion valve and preferably by means of the same apparatus which is utilized to change the temperature of the thermostatic element of the expansion valve for varying the capacity of the refrigeration system at times other than when the system is first placed into operation.

It is therefore another object of my invention both to maintain relatively high superheat upon an initial starting of the system and until such time as the suction pressure is reduced and to thereafter vary the capacity of the system in accordance with requirements all by the use of artificial or auxiliary cooling of the thermostatic element of the expansion valve by means of an auxiliary evaporator which obtains its refrigerant from the system under control.

Refrigeration systems are being used more and more, not only in test work but also in various industrial applications, for maintaining extremely low temperatures such as —100° F. At other times it is desired to operate the same refrigeration system at more normal temperatures, such as 0° F. It is a characteristic of commercial expansion valves of the thermostatic type that if set to maintain a desired superheat at say —100° F., and the system is then operated at 0° F., the expansion valve will maintain a much lower superheat at 0° F. than it does at −100° F. This is an inadequacy in the expansion valves themselves as now commercially produced.

It is another object of the present invention to provide means for correcting this condition so that an expansion valve which is set to give a predetermined superheat when the system is operating at one suction pressure will maintain the same superheat even though the suction pressure at which the system is operating is changed over a relatively wide range.

It is a further object of this invention to accomplish the above results by adjusting the superheat setting of the thermostatic expansion valve automatically in response to changes in suction pressure, it being apparent that much lower suction pressures will be maintained at −100° F. than will be maintained when the system is controlling at 0° F.

More specifically, I prefer to accomplish this by varying the super-heat setting of the expansion valve through the application of auxiliary cooling in the manner heretofore explained.

Figure 2:
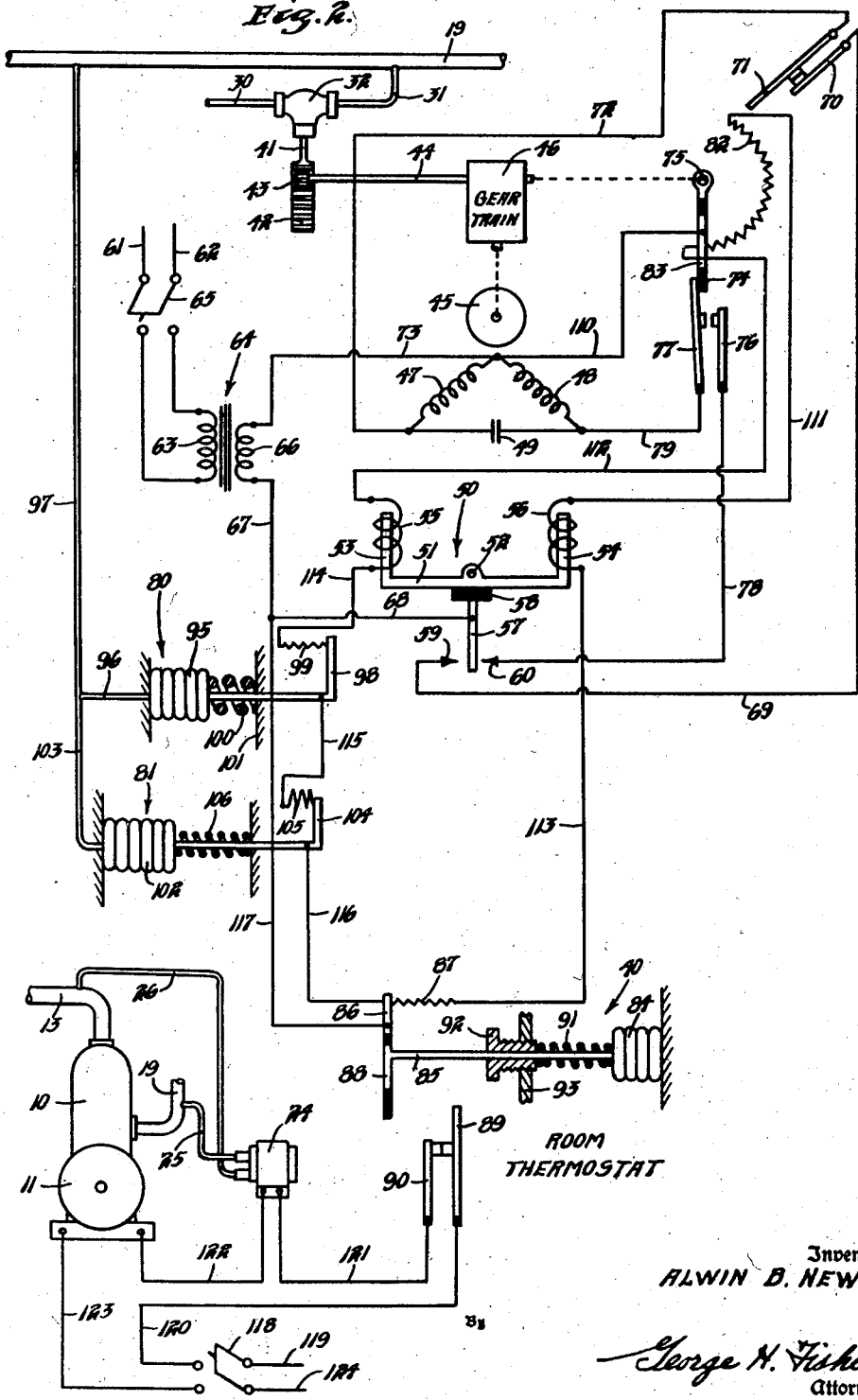
Figure 3:
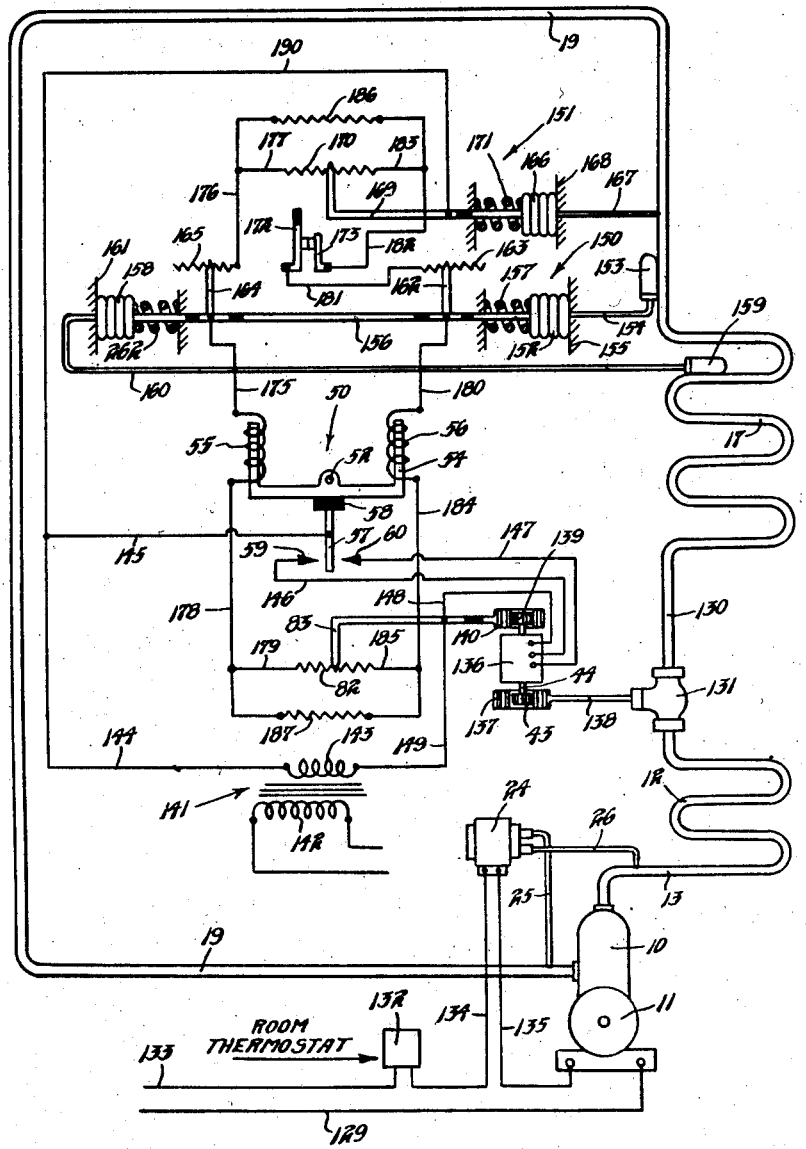

Other objects of the invention will become apparent upon a reading of the following detailed description and by reference to the accompanying drawings, in which, Fig. 1 discloses a refrigeration system the capacity of which is changed by applying variable cooling effects to the thermostatic element of a thermostatic expansion valve through the use of an auxiliary evaporator, Fig. 2 discloses a system of control for the control valve of the apparatus in Figure 1 such that the capacity of the system is varied in accordance with demand, overloading of the system is prevented upon initial starting of the same, and in which the super-heat maintained by the system may be held constant over wide ranges of suction pressure changes, and Fig. 3 discloses a further control arrangement for maintaining constant superheat even though the suction pressure varies widely and in which the system cannot initially be started under a heavy load.

Referring first to Fig. 1, a compressor 10 driven by an electric motor 11 supplies compressed refrigerant to a condenser 12 by means of a pipe 13. The outlet side of the condenser 12 is connected to the inlet of a thermostatic expansion valve 14 by means of pipes 15 and 16. The outlet side of the thermostatic expansion valve 14 is connected to an evaporator 17 by a pipe 18 and the outlet of the evaporator 17 is connected to the suction side of the compressor by a suction pipe 19. The thermostatic expansion valve 14 is connected to the suction line 19 by the usual equalizer connection 20 so that the pressure responsive member of the thermostatic expansion valve responds to the actual pressure on the suction side of the system. In addition, the expansion valve 14 is provided with the usual thermostatic responsive mechanism herein shown as comprising a bulb 21 which is connected to the expansion valve by the usual connecting pipe 22. The bulb 21 responds to the temperature of the refrigerant in the suction line 19 and to this end may be attached to the pipe 19 in any of the manners common to the art.

The apparatus thus far described comprises the ordinary compression type refrigeration system. The evaporator 17 may be used for any desired purpose and is herein shown as located in a conditioning chamber 23 through which air may be blown in the usual manner for cooling any desired room or space. Or the evaporator 17 could be located in a test box or could be utilized to cool a cold storage space or to cool any desired room or apparatus used in an industrial process.

The compressor motor 11 may be controlled in any of the usual manners and is herein shown as controlled by a switching mechanism 24 which responds to suction pressure and head pressure, being connected to the suction line 19 by a pipe 25 and to the high pressure pipe 13 by a pipe 26. This mechanism may take any of the usual forms but is preferably of the type disclosed in the Carl G. Kronmiller application, Serial No. 371,001, filed December 20, 1940, now Patent No. 2,377,503, granted June 5, 1945.

In order to modulatingly vary the capacity of the evaporator 17, I provide cooling means for the bulb 21 which preferably takes the form of a small auxiliary evaporator 27. This evaporator 27 is connected to the supply of liquid refrigerant between the expansion valve 14 and the condenser 12 by a pipe 28 that connects to the junction of pipes 15 and 16. Contained within the pipe 28 is an orifice 29 which restricts the flow of refrigerant to the auxiliary evaporator 27. The outlet side of the auxiliary evaporator 27 is shown connected to the suction line 19 by pipes 30 and 31 and a controlling valve 32. It could however be connected to the main evaporator coil 17 near its outlet end. The controlling valve 32 is utilized to modulate the flow of refrigerant through the evaporator 27 and may be controlled by any condition which is representative of the load on the system. It has herein been shown as controlled by a self contained volatile fluid room thermostat comprising a motor portion 33, a controlling bulb 34, and a connecting tube 35.

When the room is hot the control valve 32 is completely closed so that no refrigerant is flowing through the auxiliary evaporator 27. Under such conditions the cooling of the bulb 21 is due entirely to the temperature of the refrigerant in the suction line 19. The system is therefore operating as any ordinary refrigeration system operates and the evaporator 17 is operating at the capacity determined by the setting of the expansion valve 14. Such operation of the system at full capacity will begin lowering the room temperature.

Upon the first lowering in the room temperature the control valve 32 is opened very slightly. A small amount of refrigerant will now flow to the evaporator 27 and the pressure therein will depend upon the amount control valve 32 is open, the suction line pressure, etc. The initial opening of control valve 32 may not cause evaporator 27 to cool the bulb 21 below its original temperature. However, as soon as the control valve is opened sufficiently, the pressure in evaporator 27 and the amount of refrigerant flowing thereto will be sufficient to cause a small amount of additional cooling of the bulb 21. The extra cooling or lowering in temperature of the bulb 21 will result in a further closure of the expansion valve 14 so that less refrigerant is fed to the evaporator 17. This will raise the superheat of the refrigerant in the suction line 19 and this increased temperature of the suction line 19 will react on the bulb 21 so as to raise its temperature somewhat. The bulb 21 responds to temperature and cannot distinguish between the temperature condition resulting from the refrigerant in the suction line 19 or the temperature condition resulting from the auxiliary evaporator 27 or the resultant temperature condition of these two.

Therefore, upon an initial fall in the room temperature the overall effect is to slightly raise the superheat of the refrigerant in the suction line 19.

As the room temperature falls further, the control valve 32 will open more and more thereby supplying more and more refrigerant at lower and lower pressures to the auxiliary evaporator 27. This will cause further and further auxiliary cooling of the bulb 21 which must be made up by additional heat in the suction line 19 through the medium of the thermostatic expansion valve 14 cutting down on the amount of refrigerant supplied to the evaporator 17. In this manner, the capacity of the evaporator 17 is modulated in accordance with room temperature by modulating the supply of refrigerant to the auxiliary evaporator 27 for the thermostatic bulb 21 of the thermostatic expansion valve 14. As stated above, although I haves hown auxiliary evaporator 27 connected to the suction line 19, it could instead be connected into the main evaporator 17 at a point near its outlet end.

Turning now to Fig. 2, the control valve 32 is therein shown as being electrically controlled from a variable resistance modulating type of room thermostat generally indicated at 40. Those parts of the refrigeration system proper which correspond to those of Fig. 1 have been numbered in accordance with the numbering of Fig. 1. In Fig. 2, in addition, other control apparatus is disclosed to prevent overloading of the system on an initial start and also to maintain substantially constant superheat in the system upon relatively wide changes in suction pressure, as will occur when the operating temperature of the system is changed say from 0° F. to −100° F.

The control valve 32 is provided with an operating stem 41 which in turn is connected to a rack 42 provided with teeth thereon. A pinion 43 cooperates with the rack 42, and is carried by the main shaft 44 of a motor mechanism which includes a motor rotor 45 and a reduction gearing generally indicated at 46. The rotor 45 is caused to rotate in reverse directions by windings 47 and 48 and a condenser 49 under the control of a relay mechanism 50.

The relay mechanism 50 includes an armature 51 pivoted at 52 and provided with legs 53 and 54 with which windings 55 and 56 cooperate. The armature 51 operates a switch arm 57 which is carried by an insulating block 58. It will be obvious upon inspection of the showing of the relay that when winding 55 is energized sufficiently more highly than winding 56, the switch arm 57 moves into engagement with a contact 59. On the other hand, when the winding 56 is energized sufficiently more highly than the winding 55, the switch arm 57 engages a contact 60. When these windings are substantially equally energized, as they are with the parts in the position shown in Fig. 2, the switch arm 57 is intermediate contacts 59 and 60 and is not engaging either of them.

Power is supplied to the relay 50 and the motor windings 47 and 48, as well as to the system as a whole, by line wires 61 and 62 which are connected to the primary 63 of a transformer 64 through the usual manually operable line switch 65. The transformer 64 is of the step down type and has a low voltage secondary winding 66. When power is supplied to the transformer 64 and switch arm 57 engages contact 59, a circuit is established which directly energizes the motor winding 47 and energizes the motor winding 48 through the condenser 49. This circuit is as follows: starting with the lower end of secondary 66, wire 67, wire 68, switch arm 57, contact 59, wire 69, switch arm 70, switch arm 71, and wire 72. The circuit then branches, one part going directly through winding 47 and back to the upper end of transformer secondary 66 by way of wire 73 whereas the other portion goes through condenser 49 and winding 48 to wire 73 and back to the upper end of secondary 66. It will therefore be seen that the usual type of two phase circuit has been set up for the motor rotor 45 whereupon it will rotate in such a direction as to move valve 32 towards its closed position, it being shown in its fully open position. The switch arms 70 and 71 comprise one of the usual limit switches and limits movement of the valve 32 in closing direction so as to stop further energization of the motor mechanism when the valve has been fully closed. When this occurs, the insulating portion 74 of an arm secured to the final driven shaft 44, as at 75, engages switch arm 71 so as to move it away from switch arm 70. Similarly, there is a limit switch comprised by switch arms 76 and 77 which limits the opening movement of the valve. Since the valve is shown in its full open position, the insulating portion 74 is engaging the switch arm 77 so as to move it away from switch arm 76. However, assuming that the switch arms were in engagement and that the relay switch arm 57 engages contact 60, then circuits for the motor windings 47 and 48 are set up as follows: starting with the lower end of secondary 66, wire 67, wire 68, switch arm 57, contact 60, wire 78, switch arm 76, switch arm 77, and wire 79. At this point the circuit splits, one branch going directly through winding 48 to wire 73 and therefore back to the secondary 66, whereas the other branch goes through condenser 49 to winding 47 and back to the secondary 66 by way of wire 73. It will now be seen that the other winding of the motor is directly energized whereas that winding which was formerly directly energized is now energized through the condenser 49. As a result, the motor rotor 45 will rotate in the reverse direction so as to drive the valve towards open position. It will thus be seen, that except when the motor means is in one or the other of its limiting positions, energization of winding 55 to a greater extent than winding 56 causes a closing movement of the control valve 32 whereas energization of the winding 56 more highly than winding 55 results in an opening movement of the control valve 32.

The relative energizations of the windings 55 and 56 are controlled by the room thermostat 40 (previously mentioned), by a suction pressure responsive variable resistance device 80, and by a second suction pressure responsive variable resistance device 81, as well as by a balancing potentiometer. The balancing potentiometer comprises a resistance 82 with which the contact portion 83 of the arm secured to shaft 44 at 75 cooperates. The arrangement is such that the contact portion 83 completely traverses the balancing resistance 82 when the control valve 32 moves from one of its extreme positions to its other extreme position.

The room thermostat 40 is shown in its fully expanded or hot position and comprises a bellows 84 which is anchored at one end and which has secured to its other end an operating member 85. The operating member 85 includes an upwardly extending portion 86 which cooperates with a control resistance 87. It also has a downwardly extending arm 88 which engages a switch arm 89 when the room thermostat is fully contracted in response to low temperature so as to move such switch arm 89 out of engagement from a switch arm 90 to thereby deenergize the compressor motor 11 as will be evident upon an examination of the simple series circuit for such compressor motor. Movement of the bellows 84 is opposed by a relatively long light coil spring 91 which may be adjusted by means of a nut 92 threaded into a stationary portion of the apparatus shown at 93. As the nut 92 is screwed inwardly, the spring 91 is compressed more and more so that higher and higher temperatures will be required in the room in order to cause movement of the bellows to its fully expanded position in which it is shown.

The suction pressure responsive mechanism 80 is the one which maintains substantially constant superheat when the system operates on widely different suction pressures. This mechanism includes a bellows 95 anchored at one end and having such end connected to the suction pipe 19 by pipes 96 and 97. The other end of the bellows 95 operates a contact arm 98 which in turn cooperates with a relatively long but electrically small resistance 99. In addition, a relatively heavy short coil spring 100 opposes movement of the bellows 95 and to this end has one of its ends engaging the movable end of the bellows 95 and its other end engaging a stationary support 101. This short heavy spring requires that the suction pressure vary over a wide range in order for contact arm 98 to completely traverse resistance 99. In other words, the mechanism 80 has a very wide differential.

The suction pressure responsive device 81 is the one which prevents operation of the refrigeration system at high capacity when the same is first placed in operation. This device includes a bellows 102 anchored at one end and having such end connected to the suction pipe 19 by the pipe 97 and a pipe 103. The movable end of bellows 102 operates an arm 104 which cooperates with a relatively short but electrically large resistance 105. Movement of bellows 102 is opposed by a relatively long light coil spring 106 so that fairly small changes in suction pressure, say five pounds, will cause contact arm 104 to completely traverse resistance 105.

The contact portion 83 of the balancing potentiometer is connected to the upper end of secondary 66 by the wire 73 and a wire 110. The upper end of balancing resistance 82 is connected to the upper end of winding 56 by a wire 111 whereas the lower end of such balancing resistance is connected to the upper end of winding 55 by a wire 112. The lower end of winding 56 is directly connected to the right hand end of the room thermostat control resistance 87 by a wire 113. The lower end of winding 55 is connected to the left hand end of the room thermostat control resistance 87 through the resistances 99 and 105 by wires 114, 115, and 116. The contact arm 86 which cooperates with the room thermostat resistance 87 is connected to the lower end of secondary 66 by a wire 117 and the wire 67.

Operation of Figure 2

With the parts in the position shown, the system is shut down since the line switch 65 as well as a line switch 118 in series with the compressor motor 11 are both open. As a result, the suction pressure of course is high so that bellows 95 and 102 are expanded and their respective contact arms 98 and 104 are at the extreme right hand ends of the cooperating resistances 99 and 105. Likewise, the room temperature is high so that bellows 84 is expanded fully and the contact arm 86 is at the extreme left hand end of cooperating resistance 87. The control valve 32 is fully open and the balancing contact 83 is at the extreme lower end of balancing resistance 82.

To place the system in operation, the line switches 65 and 118 are both closed. The compressor motor 11 is thereupon energized by a circuit as follows: line wire 119, line switch 118, wire 120, switch arm 89, switch arm 90, wire 121, the high and low pressure switch 24, wire 122, compressor motor 11, wire 123, and line switch 118 to the other line wire 124. Also, the windings 55 and 56 are energized. The circuit for the winding 55 is as follows: from the upper end of secondary 66, wire 73, wire 110, balancing contact arm 83, wire 112, winding 55, wire 114, all of resistance 99, contact arm 98, wire 115, all of resistance 105, contact arm 104, wire 116, contact arm 86, wire 117, and wire 67 to the lower end of secondary 66. The energizing circuit for winding 56 is as follows: from the upper end of secondary 66, wire 73, wire 110, balancing contact arm 83, all of the balancing resistance 82, wire 111, winding 56, wire 113, all of room thermostat resistance 87, contact arm 86, wire 117, and wire 67 to the lower end of secondary 66. The resistance 105 should be approximately twice that of resistances 87 and 82 which in turn are equal to each other. The resistance 99 is much less. Therefore, the winding 56 has somewhat less resistance in series with it than the winding 55 and is the more highly energized. Even if this were sufficient to move contact arm 57 into engagement with contact 60, nothing could happen since the circuit thus established is a valve opening circuit and the valve is already wide open with the limit switch arms 76 and 77 separated.

Upon starting of the compressor, liquid refrigerant is furnished to the main evaporator and also a maximum supply is furnished to the auxiliary evaporator since the control valve 32 is wide open. The thermostatic expansion valve is therefore operating under its highest superheat conditions so that very little, if any, refrigerant is permitted to flow to the evaporator. As a result, the system when it first starts up must start at a reduced capacity and cannot overload the compressor or compressor motor. As the system continues to operate however, the suction pressure will begin reducing. Upon a relatively small reduction, the long light spring 106 will substantially compress the bellows 102 so that contact arm 104 will move to the left along resistance 105 to cut part of it out of the circuit of winding 55. This change in suction pressure however will not be sufficient to cause any appreciable movement of slider 98 along resistance 99.

The energization of winding 55 will therefore gradually increase and when slider 104 has moved part way along resistance 105, the energization of winding 55 will become great enough in respect to winding 56 to swing contact arm 57 into engagement with contact 59. The motor mechanism will thereupon be energized by the circuits previously traced so as to move valve 32 towards its closed position. As such movement takes place, the balancing contact arm 83 begins moving upwardly towards the top of balancing resistance 82 to insert part of the balancing resistance in circuit with winding 55 and remove some of the balancing resistance from the circuit for winding 56. This will continue until the two relay windings 55 and 56 are again substantially equally energized so that contact arm 57 moves away from contact 59. This partial closing of control valve 32 reduces the supply of refrigerant to the auxiliary evaporator so that less auxiliary cooling is furnished to the bulb of the thermostatic expansion valve. This in effect reduces the superheat setting thereof so that more refrigerant is admitted to the evaporator and the system begins picking up the load. In this manner, as the suction pressure is reduced, the control valve 32 is moved closer and closer to its fully closed position and, when the suction pressure has been reduced sufficiently, say five pounds, the contact arm 104 will have cut out all of the resistance 105 and control valve 32 will be nearly closed. The system will then be operating at substantially its full capacity. This small reduction of five pounds in the suction pressure has caused very little movement, if any, of slider 98 along resistance 99 so that substantially all of resistance 99 is still in the circuit. This prevents complete closing of control valve 32 for reasons which will soon appear.

With the room thermostat adjusted as shown wherein the spring 91 is fully expanded, that is, the adjusting nut 92 is screwed all the way out, the thermostat is set to operate at say $-100°$ F. This means that the suction pressure will have to be reduced a great deal. As this suction pressure continues to be reduced the arm 98 moves along resistance 99 to the left and when the suction pressure has been reduced sufficiently for operating at such controlling temperature, all of the resistance 99 will have been removed from the circuit. Under these conditions then, and until the temperature of the room or box lowers, the control valve 32 will be fully closed or substantially closed so that the system is operating at its full capacity. Under these conditions the thermal expansion valve is receiving no auxiliary cooling and will control to give a normal amount of superheat, due to its conventional adjustment, such as 10 degrees.

Now, as the room temperature begins to fall, the slider 86 will move along resistance 87 towards its right hand end. The circuit for winding 55 now includes all of the balancing resistance 82 but substantially little of the resistance 87, whereas the circuit for winding 56 includes none of the balancing resistance 82 but substantially all of the resistance 87. Then, as the slider 86 moves to the right, so as to add some of the resistance 87 to the circuit for winding 55 and remove some of it from the circuit for winding 56, winding 56 will become more highly energized than winding 55 whereupon contact arm 57 will swing into engagement with contact 60. This will energize the motor mechanism so as to move it back towards the open position for control valve 32. As it so moves, the balancing contact arm 83 begins moving downwardly away from the upper end of balancing resistance 82 so as to rebalance the energizations of windings 55 and 56 and move contact arm 57 away from contact 60. Thus, as the room temperature is reduced, the control valve 32 will be opened wider and wider so as to permit the supplying of larger and larger amounts of refrigerant to the auxiliary evaporator for the thermostatic element of the thermostatic expansion valve. When the room temperature is down to the proper value, arm 86 will engage the extreme right hand end of resistance 87 and the control valve 32 will be completely opened with the balancing contact arm 83 in the position shown. Remembering that all of the resistance 99 as well as all of the resistance 105 has been cut out of the circuit, then we have a condition wherein winding 55 has all of the control resistance 87 in circuit with it and the winding 56 has all of the balancing resistance 82 in its circuit. Since these resistances are equal, the two windings are equally energized and the contact arm 57 is in its intermediate position shown. The system is now operating at its minimum capacity as explained in Fig. 1 under conditions where the control valve 32 is all the way open.

Now let us assume that it is desired to operate the room or box at a new temperature. Let us assume that this new temperature is $0°$ F. which is much higher than the temperature theretofore maintained. The nut 92 of the room thermostat 40 is screwed in so as to greatly compress the spring 91. As a result, the room temperature or box temperature must rise much higher than before in order for the bellows 84 to overcome the spring 91. Operating under these new conditions and assuming that the load on the system is such that the room thermostat is fully expanded, the suction pressure will rise materially but it will still be low enough so as to cut out all of resistance 105. However, due to the increase in suction pressure part or all of resistance 99 will now be reinserted into the circuit. Therefore, even with the room thermostat demanding all of the cooling possible, the valve 32 will not be fully closed since the winding 55 will now have the resistance 99, or part of it, in series with it. This means that the thermostatic expansion valve will be operating at a little higher superheat than it has been mechanically adjusted to maintain because a small amount of auxiliary cooling is taking place. However, it is a well known characteristic of commercial expansion valves of the thermostatic type, that if set to maintain a normal superheat of $10°$ F. while operating at a suction pressure so as to maintain $-100°$ F., then if the system is operated at a higher suction pressure so as to maintain $0°$ F. without changing the mechanical setting of the expansion valve, it will maintain a lower superheat than before. This is inherent in the construction of commercial thermostatic expansion valves of today. However, by reason of the insertion of resistance 99 so as to maintain the control valve 32 slightly open even when the room thermostat is demanding full cooling, the desired superheat of $10°$ F. will be maintained without the operator mechanically readjusting the thermostatic expansion valve.

From the foregoing, it will be seen that in Fig. 2 the room thermostat 40 of the variable resistance type, in combination with the electric motor mechanism, operates the control valve 32 in the same manner as the self contained room thermostat of Fig. 1. In addition, whenever the room thermostat is entirely satisfied and the room or box temperature has been reduced to the desired amount, the arm 88 moves switch arm 89 from engagement with contact 90 so as to shut down the compressor under such conditions. Furthermore, the suction pressure responsive device 81 is so correlated with the room thermostat 40 and the balance of the electrical system as to prevent initial operation of the system at high capacity until such time as the suction pressure has been reduced, thereby preventing overloading of the compressor and the compressor motor. In addition, the suction pressure responsive device 80 which responds fully only to a much lower suction pressure, modifies the action of the thermostatic expansion valve so as to maintain a desired amount of superheat irrespective of whether the system is operating at a relatively high suction pressure or at a very low suction pressure.

Turning now to Fig. 3, a further modification is shown by means of which constant superheat may be maintained in a refrigeration system even though it operates under widely fluctuating suction pressures. In addition, means are provided to prevent operation of the system at high capacity until such time as the suction pressure has been reduced a reasonable amount.

In Fig. 3, certain of the parts correspond to similar parts disclosed in Figs. 1 and 2 and have therefore been given the same reference characters. A refrigeration system is disclosed having the compressor 10 driven by the electrical motor 11 for delivering refrigerant to a condenser 12 by means of the pipe 13. The condenser 12 is connected to the evaporator 17 by a pipe 130 which contains a valve 131 that is controlled in such a manner as to make it equivalent to the ordinary expansion valve. The evaporator 17 is in turn connected to the suction side of the compressor 10 by the suction line 19. The compressor motor 11 may be controlled in any desired manner as by the combined high pressure and suction pressure controller 24 previously explained in connection with Fig. 1. In addition, a room thermostat 132 may be included so that the compressor motor 11 is controlled by a circuit as follows: line wire 133, room thermostat 132, wire 134, controller 24, wire 135, compressor motor 11, and the other line wire 129.

The valve 131 is positioned by an electric motor mechanism 136 which may be of the same general type disclosed in Fig. 2. It therefore includes a main operating shaft 44 which drives a pinion 43. This pinion 43 cooperates with a rack 137 attached to a valve stem 138 for the valve 131. In addition, the motor mechanism 136 drives a balancing potentiometer comprising the resistance 82 and the contact arm 83. The connection between the final driven shaft 44 and the balancing contact arm 83 is herein shown as comprising a second pinion 139, also secured to the shaft 44, and a rack 140 with which such pinion 139 cooperates, the rack 140 in turn being connected to the balancing contact arm 83.

The motor mechanism 136 is energized for reverse rotation or for entirely stopping the same by the relay mechanism 50 which corresponds exactly to the relay mechanism of Fig. 2. Power for operating the motor mechanism 136 is supplied by a transformer 141 having a high voltage primary 142 and a low voltage secondary 143. One side of secondary 143 is connected to the switch arm 57 of the relay 50 by wires 144 and 145. The contacts 59 and 60 of such relay are connected to the motor mechanism 136 by wires 146 and 147. Further, the motor mechanism 136 is connected to the other side of the secondary 143 by wires 148 and 149.

In view of the explanation of Fig. 2, it should be obvious that when relay coil 56 is more highly energized than relay coil 55, switch arm 57 engages contact 60. When this occurs a circuit is established for the motor 136 as follows: secondary 143, wire 144, wire 145, switch arm 57, contact 60, wire 147, motor mechanism 136, wire 148, and wire 149 to the other side of secondary 143. In Fig. 3, such energization of the motor mechanism 136 is arranged to move valve 131 towards open position and to move balancing contact arm 83 towards the left hand end of balancing resistance 82. On the other hand, when the winding 55 is energized more highly than winding 56, switch arm 57 engages contact 59 to establish a motor circuit for driving the motor in the opposite direction as follows: secondary 143, wire 144, wire 145, switch arm 57, contact 59, wire 146, motor mechanism 136, wire 148, and wire 149 to the other side of secondary 143. Such reverse movement of the motor mechanism 136 drives the valve 131 towards closed position and moves the balancing contact arm 83 along resistance 82 towards its right hand end.

The motor mechanism 136 is controlled by a differential controller generally indicated at 150 and a suction pressure device 151. The differential controller 150 is herein shown as including two thermostatic responsive devices. One of these comprises a bellows 152 connected to a bulb 153 by a tube 154. The bulb 153 is associated with the suction line 19 so as to respond to the temperature of the refrigerant after it has evaporated and become superheated. The right hand end of bellows 152 is secured to a fixed support 155 and the left hand end thereof is attached to an operating rod 156. For purposes of adjustment, a spring 157 may be provided for opposing the expansion of the bellows 152. The second thermostatic responsive device of the differential controller 150 comprises a bellows 158, a controlling bulb 159, and a connecting tube 160. The bulb 159 is associated with the evaporator at a point where the refrigerant has no superheat so that it responds to the temperature of the refrigerant at the prevailing suction pressure. The bellows 158 could respond to suction pressure, such as is usual in the refrigeration art, but there are certain advantages in having it respond to temperature and being in the form of a volatile fill type of thermostat as will be later explained. The bellows 158 has its left hand end secured to a support 161 and its right hand end is connected to the operating rod 156. A spring 262 may be provided for opposing expansion of the bellows 158.

The operating rod 156 is provided with a contact arm 162 that cooperates with a resistance 163 and with a second contact arm 164 that cooperates with a resistance 165. It will be noted that the contact arms 162 and 164 are insulated from the main operating rod 156 so that these contact arms are electrically independent of each other.

The suction pressure responsive controller 151 includes a bellows 166 that is connected to the suction line 19 by a pipe 167. The right hand end of bellows 166 is anchored to a support 168 and its left hand end operates a contact arm 169 that cooperates with a resistance 170. A spring 171 may be provided to oppose the expansive movement of bellows 166 upon increase in suction pressure in order that the instrument may be adjusted as desired. Also associated with the contact arm 169 is a pair of switch arms 172 and 173, the arrangement being such that upon high suction pressure and consequent movement of the contact arm 169 sufficiently far to the left, switch arm 172 is engaged and moved away from switch arm 173.

The remaining circuit connections will now be described. The upper end of relay coil 55 is connected to the contact arm 164 by a wire 175. The right hand end of resistance 165 which cooperates with the contact arm 164 is connected to the left hand end of resistance 170 by wires 176 and 177. The lower end of relay coil 55 is connected to the left hand end of balancing resistance 82 by wires 178 and 179. Similarly, the upper end of relay coil 56 is connected to the contact arm 162 by a wire 180. The cooperating resistance 163 is connected to switch arm 172 by a wire 181 and the cooperating switch arm 173 is connected to the right hand end of resistance 170 by wires 182 and 183. The lower end of relay coil 56 is connected to the right hand end of balancing resistance 82 by wires 184 and 185. A resistance 186 is connected in parallel with the resistance 170 and in like manner a resistance 187 is connected in parallel with the balancing resistance 82. The purpose of these parallel connected resistances will be explained hereinafter.

*Operation of Figure 3*

For the moment, let us consider that the bellows 166 of the suction pressure controller 151 is disconnected from the contact arm 169 so that it remains in the center position shown, under all conditions of suction pressure. Further, with the parts in the position shown, the superheat is at the desired value, the valve 131 is half open, and the relay coils 55 and 56 are equally energized so that switch arm 57 is intermediate contacts 59 and 60 and is not engaging either one of them. Now let it be assumed that the superheat increases above that desired. This means that the temperature to which bulb 153 responds will become more than the predetermined desired amount higher than the temperature to which the bulb 159 responds. Bellows 152 will therefore exert an increased force in respect to bellows 158 and operating rod 156 will be shifted to the left. This means that part of resistance 163 is removed from the circuit of relay winding 56 and more of resistance 165 is inserted into the circuit of relay winding 55. Winding 56 therefore becomes more highly energized than winding 55. The circuit for winding 56 under these conditions is as follows: from the left hand side of transformer secondary 143, wire 144, wire 190, contact arm 169, the right half of resistance 170, wire 183, wire 182, switch arm 173, switch arm 172, wire 181, a small portion of resistance 163, contact arm 162, wire 180, relay winding 56, wire 184, wire 185, the right hand half of balancing resistance 82, balancing contact arm 83, and wire 149 to the other side of secondary 143. The circuit for relay winding 55 is as follows: from the left hand side of secondary 143, wire 144, wire 190, contact arm 169, the left hand half of resistance 170, wire 177, wire 176, a relatively large portion of resistance 165, contact arm 164, wire 175, relay winding 55, wire 178, wire 179, the left hand half of balancing resistance 82, balancing contact arm 83 and wire 149 to the other side of secondary 143. Since relay coil 56 is now more highly energized than relay coil 55, switch arm 57 engages contact 60 to energize motor mechanism 136, in the manner previously described, whereupon valve 131 is opened further and balancing contact arm 83 moves along balancing resistance 82 towards its left hand end. Such movement increases the amount of resistance in series with winding 56 and decreases the amount of resistance in series with winding 55. Therefore, when sufficient movement has resulted, these windings will again be equally energized whereupon the motor mechanism 136 will be deenergized and further opening movement of valve 131 will cease. With valve 131 opened to a wider position, more refrigerant is fed to the evaporator 17 so that the superheat is reduced. In other words, the temperature differential between the bulbs 153 and 159 is again brought back to the desired value. Thus, upon increase in the superheat over the desired value, the operating rod 156 is moved further and further towards the left so that motor mechanism 136 opens the valve 131 further and further in the manner just described.

On the other hand, upon a reduction in the superheat below the desired value so that the temperature at bulb 153 is no longer as high above that of bulb 159 as desired, the main operating rod 156 will move towards the right. Now, part of resistance 165 in series with winding 55 will be removed from such circuit and more of resistance 163 which is in series with winding 56 will be added to its circuit. Therefore, the winding 55 becomes more highly energized than the winding 56. Switch arm 57 thereupon engages contact 59 and motor mechanism 136 is driven in the reverse direction so as to move valve 131 towards its closed position. At the same time, the balancing contact arm 83 moves along balancing resistance 82 towards its right hand end so as to rebalance the energizations of windings 55 and 56.

In this manner, with the parts thus far described wherein the suction pressure controller 151 is disconnected, the valve 131 is operated in a manner which it would appear would maintain desired superheat under all conditions. However, the fact remains that the superheat will vary considerably upon relatively wide changes in suction pressure. The reason for this is that the pressures produced by a volatile fill thermostat will not change equally upon equal changes in temperature at their controlling bulbs at different temperature levels. In other words, suitable fills for such thermostats are not such that the pressures change in equal increments for equal temperature changes. This variation is not serious when the suction pressure is only fluctuating over a few pounds. However, in low temperature refrigeration work, this does result in the maintenance of superheats which are not desired. In other words, if the apparatus is set so as to give a desired amount of superheat at low suction pressure, then as the suction pressure increases, the amount of superheat will decrease. The purpose of the suction pressure responsive device 151 is to correct this condition. The resistances 163 and 165 are so chosen that their cooperating contact arms 162 and 164 need only move over a portion of such resistances in order to obtain complete opening and closing movements of the valve 131. The suction pressure responsive device, by moving contact arm 169 along resistance 170, shifts the control point of the differential pressure responsive controller 150. In other words, while the same differential pressure change must take place in order to operate the valve 131 from full open to full closed position, the value of differential pressures at which such movements occur are shifted by the suction pressure responsive controller 151.

With the parts in the position shown let us assume there is a substantial increase in suction pressure but that the superheat remains the same. The temperature at bulbs 153 and 159 will both therefore rise but they will rise to the same extent. However, bulb 153 is responding to a higher temperature than bulb 159, since it is responding to the superheat. Bulb 153 is therefore operating on a different part of the vapor expansion curve of the fluid with which it is charged than is bulb 159. On this higher part of the curve, the pressure increase per degree of temperature rise is greater than on the lower part of the curve. The result is therefore that even though the temperatures at bulbs 153 and 159 have risen to the same extent, the increase in pressure in bellows 152 has been greater than the increase in pressure in the bellows 158. The differential pressure controller 150 will therefore have its main operating rod 156 moved to the left just as though there had been an increase in the superheat. In other words, insofar as the differential pressure controller 150 is concerned, it believes there has been an increase in superheat when actually there has been none. Therefore, were it not for the suction pressure controller 151, the valve 131 would be opened further as previously explained due to taking part of the resistance 163 out of the circuit for winding 56 and inserting more of the resistance 165 into the circuit for winding 55. However, this rise in suction pressure also causes bellows 166 of the suction pressure device 151 to expand and move contact arm 169 to the left along resistance 170. Such movement adds resistance to the circuit for winding 56 and removes resistance from the circuit for winding 55. By properly proportioning the various resistance values, these increases and decreases may be made to offset each other so that windings 55 and 56 remain equally energized. The valve 131 therefore remains in the same position and the ultimate result has been to merely shift the control point of the differential controller 150.

If, on the other hand, the suction pressure should be materially reduced and the superheat should remain the same, the temperature of both bulbs 153 and 159 would be reduced to the same extent. However, the pressure in bellows 152 would be reduced to a greater extent than the pressure in bellows 158 for the reasons pointed out above, and the operating rod 156 would move to the right thinking that there had been a decrease in superheat. The valve 131 would therefore tend to close so as to counteract this apparent decrease in superheat. However, at the same time the suction pressure device 151 would have its bellows 166 contract so that contact arm 169 moves along resistance 170 to the right and counteract the movement of operating rod 156. In this manner, constant superheat may be maintained upon wide fluctuations in suction pressure.

As stated above, the bellows 158 could be connected directly to the suction line as is common practice instead of being connected to the thermostatic bulb 159. However, if this were done, the response of the mechanism would be much smaller since the pressure curve for the well known refrigerants has a much slower rise when plotted against temperature than does the fluids ordinarily used in volatile fluid thermostats. For this reason, and particularly in low temperature refrigeration work where it is desired to maintain constant superheats over relatively wide ranges, the construction of the apparatus is simpler and a better response may be obtained by the use of two temperature responsive bulbs instead of the usual temperature responsive bulb and suction pressure responsive connection. However, either would work.

The motor mechanism 136 is a standard commercial product in which the balancing resistance 82 is built into as a standard part of the equipment. This balancing potentiometer or resistance has a resistance of 135 ohms. Likewise, differential controllers of the type indicated at 150 are a standard product in which each of the resistances 163 and 165 are 135 ohms. Likewise, suction pressure devices such as 151 are standard products in which the resistance 170 has a resistance of 135 ohms. It will be evident that if the differential controller 150 is to cause the complete movement of the motor mechanism 136 without the contact arms 162 and 164 traversing the complete resistances 163 and 165, these resistances must be greater than the balancing resistance 82 and the resistance 170. Therefore, instead of changing a commercial product and inserting a new resistance therein, it is much simpler to reduce the effective resistance of the resistances 82 and 170 by connecting in the parallel resistances 187 and 186. Also, this provides a simple way by means of which the amount of correction given to differential controller 150 for a given movement of suction responsive controller 151 may be varied. It is only necessary to substitute different parallel resistance 186. Therefore, if a smaller resistance is substituted at 186, the correcting or compensating effect of the suction pressure responsive controller 151 can be increased. By doing this, upon high suction pressures "over-correction" can be obtained so as to prevent the refrigeration system from operating at full capacity when the suction pressure is relatively high thereby preventing overloading of the compressor. Also, the switch 172, 173 is arranged to be opened upon high suction pressure and this interrupts the circuit for relay winding 56 which is the opening circuit for valve 131. In this manner, the valve 131 may be compelled to completely close until the suction pressure has been reduced to some predetermined desired value thereby preventing any loading of the compressor upon extremely high suction pressure. With the valve 131 closed, operation of the compressor would soon reduce the suction pressure whereupon switch arm 172 will engage switch arm 173 and put the system into normal operation.

It will be obvious that many changes and modifications may be made in the various forms of the invention herein disclosed without departing from the fundamental concept thereof and I therefore intend to be limited only in view of the scope of the appended claims.

I claim as my invention:

1. In a refrigeration system having an evaporator, in combination, an expansion valve in control of the flow of refrigerant to the evaporator and including a thermostatic element responsive to the temperature of the refrigerant leaving the evaporator, an auxiliary evaporator associated with the thermostatic element of the expansion valve for cooling the same to vary the superheat maintained at the outlet of said evaporator by the expansion valve, conduit means for supplying refrigerant to said auxiliary evaporator from the main system from a point upstream of the main evaporator, restrictor means in said conduit means, and means including a valve arranged to prevent or establish the discharge of refrigerant from the auxiliary evaporator.

2. In a refrigeration system having an evaporator, in combination, an expansion valve in control of the flow of refrigerant to the evaporator and including a thermostatic element responsive to the temperature of the refrigerant leaving the evaporator, an auxiliary evaporator associated with the thermostatic element of the expansion valve for cooling the same to vary the superheat maintained at the outlet of said evaporator by the expansion valve, conduit means for supplying refrigerant to said auxiliary evaporator from the main system from a point upstream of the main evaporator, restrictor means in said conduit means, and a modulating valve for modulatingly varying the flow of refrigerant from the auxiliary evaporator.

3. In a refrigeration system, an evaporator, means for supplying refrigerant thereto, an expansion valve in control of the supply of refrigerant to the evaporator, said expansion valve including a thermostatic element responsive to the temperature of the refrigerant leaving the evaporator, pipe means for conducting refrigerant from the refrigerant supply in heat transfer relationship to said thermostatic element and returning it to the system downstream of the evaporator, valve means for modulating the flow of refrigerant through said pipe means, and means responsive to the suction pressure in the system to prevent closing of said valve means if the suction pressure is too high.

4. In a refrigeration system, an evaporator, means for supplying refrigerant thereto, an expansion valve in control of the supply of refrigerant to the evaporator, said expansion valve including a thermostatic element responsive to the temperature of the refrigerant leaving the evaporator, pipe means for conducting refrigerant from the refrigerant supply in heat transfer relationship to said thermostatic element and returning it to the system downstream of the evaporator, valve means for modulating the flow of refrigerant through said pipe means, temperature responsive means in control of said valve means for closing the same upon rise in temperature, and means responsive to the suction pressure in the system to prevent closing of the valve means if the suction pressure is above a predetermined value.

5. In a refrigeration system, an evaporator, means for supplying refrigerant thereto, an expansion valve in control of the supply of refrigerant to the evaporator, said expansion valve including a thermostatic element responsive to the temperature of the superheated refrigerant leaving the evaporator, pipe means by-passing the evaporator and expansion valve for conducting refrigerant from the refrigerant supply in heat transfer relationship to said thermostatic element and returning it to the system downstream of the evaporator, adjustable valve means for controlling the flow of refrigerant through said pipe means, and means responsive to the suction pressure in the system to open said valve means upon rise in suction pressure to an extent such as to maintain the superheat of the refrigerant leaving the evaporator constant upon such wide variations in suction pressure that the superheat would normally vary.

6. In a refrigeration system, an evaporator, means for supplying refrigerant thereto, an expansion valve in control of the supply of refrigerant to the evaporator, said expansion valve including a thermostatic element responsive to the temperature of the refrigerant leaving the evaporator, pipe means for conducting refrigerant from the refrigerant supply in heat transfer relationship to said thermostatic element and returning it to the system downstream of the evaporator, valve means for modulating the flow of refrigerant through said pipe means, and means responsive to suction pressure to maintain said valve means open sufficiently to reduce the flow of refrigerant through the evaporator to a safe value when the suction pressure is so high that the system would otherwise be overloaded.

7. In a refrigeration system including an evaporator, in combination, thermostatic expansion valve means in control of the flow of refrigerant to the evaporator for normally maintaining a predetermined superheat of the refrigerant leaving the evaporator, auxiliary means to change the temperature of the temperature responsive portion of the thermostatic expansion valve means to a value other than would be obtained by the temperature of said evaporator alone, and means responsive to suction pressure to control said auxiliary temperature changing means to cause a high superheat to be maintained when the suction pressure is high.

8. In a refrigeration system adapted to have its suction pressure varied over relatively wide ranges, an evaporator, thermostatic expansion valve means in control of the flow of refrigerant to said evaporator, the superheat of said refrigerant at the outlet of said evaporator normally varying for a single setting of said thermostatic expansion valve means upon such relatively wide variations in the suction pressure, auxiliary temperature changing means for affecting the thermostatic portion of said thermostatic expansion valve means so that its temperature is other than it would be due to the action of the evaporator alone, and means operated in response to suction pressure for controlling said auxiliary temperature changing means to vary the temperature of the thermostatic portion of said thermostatic expansion valve means so as to maintain a constant superheat of said refrigerant at said outlet of the evaporator upon wide fluctuations in suction pressure.

9. In a refrigeration system having an evaporator and a valve in control of the flow of refrigerant thereto, in combination, differential pressure responsive means in control of said valve, said differential pressure responsive means including a fluid fill type thermostat responsive to the temperature of the refrigerant leaving the evaporator for producing one of the pressures for said differential pressure responsive means, the fluid fill being such that the pressures produced thereby vary unequally upon equal changes in temperature, the other of said pressures being varied upon changes in the pressure of the refrigerant in said evaporator, and means responsive to suction pressure for varying the response of said differential pressure responsive means to maintain the superheat of the refrigerant leaving said evaporator constant irrespective of the unequal pressure changes produced by said fluid fill type thermostat upon equal temperature changes.

10. In a refrigeration system having an evaporator and a valve in control of the flow of refrigerant thereto, in combination, a differential pressure responsive means in control of said valve and including a pair of fluid filled thermostats for producing the opposing pressures of said differential pressure responsive means, said fluid filled thermostats each having a fill such that unequal changes in pressure are produced upon equal temperature changes, one of said thermostats responding to the temperature of the refrigerant leaving said evaporator after it has become superheated and the other responding to the temperature of the evaporated refrigerant before it becomes superheated, whereby upon fluctuations in suction pressure varying superheats would be maintained by said pressure differential responsive means by reason of the unequal changes in pressure produced by said thermostats upon equal changes in temperature, and means responsive to the suction pressure for modifying the action of said differential pressure responsive means on said valve to maintain the superheat of the refrigerant leaving said evaporator constant upon changes in suction pressure.

11. A control mechanism for a refrigeration system having an evaporator and a valve in control of the flow of refrigerant thereto, comprising, in combination, motor means for actuating said valve, means including an electric circuit for controlling said motor means, circuit adjusting means for said electric circuit, and a pair of fluid filled thermostats for producing opposing pressures to control said circuit adjusting means, said fluid filled thermostats each having a similar fill, one of said thermostats responding to the temperature of the refrigerant leaving said evaporator after it has become superheated and the other responding to the temperature of the evaporated refrigerant before it becomes superheated.

12. In a refrigeration system having an evaporator and a valve in control of the flow of refrigerant thereto, in combination, differential pressure responsive means in control of said valve, said differential pressure responsive means including a fluid fill type thermostat responsive to the temperature of the refrigerant leaving the evaporator for producing one of the pressures for said differential pressure responsive means, the fluid fill being such that the pressures produced thereby vary unequally for equal changes in temperature, the other of said pressures being varied upon changes in the pressure of the refrigerant in said evaporator, and means responsive to suction pressure for varying the response of said differential pressure responsive means upon increase in suction pressure to maintain the superheat of the refrigerant leaving said evaporator higher than it would otherwise be.

13. In a refrigeration system having an evaporator and a valve in control of the flow of refrigerant thereto, in combination, means in control of said valve to control the superheat of the refrigerant leaving the evaporator, said valve control means including a fluid fill type thermostat responsive to the temperature of the refrigerant leaving the evaporator for producing a pressure for controlling said valve control means, the fluid fill being such that the pressures produced thereby vary unequally for equal changes in temperature, means responsive to suction pressure for varying the action of said valve control means to maintain the superheat of the refrigerant leaving said evaporator constant irrespective of the unequal pressure changes produced by said fluid fill type thermostat upon equal temperature changes, and means operable in response to a predetermined suction pressure for increasing the amount of said superheat during the initial operation of said system.

14. For use in a refrigerating system to control the action of a thermostatic expansion valve having a thermostatic bulb element in heat exchange relation to a portion of said system; control means comprising, in combination, an auxiliary evaporator arranged to be associated in heat exchange relation to said bulb element, said evaporator having an inlet and an outlet, restrictor means in said inlet, and valve means controlling said outlet.

15. In a refrigerating system including an evaporator and a valve for controlling refrigerant flow through the evaporator, in combination, electrically operated actuating means for said valve, first means for responding to the temperature of the evaporator at a location wherein liquid refrigerant is present, second means for responding to the temperature at the outlet of said evaporator, and electric circuit means controlled by said first and second temperature responsive means for regulating said actuating means.

16. Control means for a refrigerating apparatus of the type including an evaporator and an expansion valve comprising, in combination, expansion valve motor operator means, follow-up means adjustable by said operator means, means for responding to evaporator outlet temperature including a variable resistor, means for responding to evaporator temperature at an intermediate location and including a variable resistor, electrical circuit means including said follow-up means and both of said resistor means, and relay means controlled by said electrical circuit means and arranged to control said operator means in a manner to maintain predetermined differences in temperature between said outlet temperature responsive means and said intermediate temperature responsive means.

17. In a refrigerating system of a sort wherein its suction pressure may vary over a relatively wide range and including a thermostatic expansion valve and an evaporator, said expansion valve being arranged to control refrigerant flow through said evaporator and having a thermostatic element arranged to respond to the temperature of refrigerant leaving said evaporator, an auxiliary cooling means in heat exchange relation with said thermostatic element, and control means for said auxiliary cooling means, said control means including means responsive to the suction pressure of said system.

ALWIN B. NEWTON.

REFERENCES CITED

The following references are of record in the file of this patent:

UNITED STATES PATENTS

| Number | Name | Date |
|---|---|---|
| 1,987,948 | Smith | Jan. 15, 1935 |
| 2,056,401 | Hoesel | Oct. 6, 1936 |
| 2,258,485 | Lange | Oct. 7, 1941 |
| 2,280,425 | Sanders | Apr. 21, 1942 |
| 2,291,898 | Holmes | Aug. 4, 1942 |
| 2,313,391 | Newton | Mar. 9, 1943 |
| 2,319,993 | Kaufman | May 25, 1943 |
| 2,353,240 | Huggins | July 11, 1944 |
| 2,377,503 | Kronmiller | June 5, 1945 |